United States Patent [19]

Braunhut

[11] 3,899,167

[45] Aug. 12, 1975

[54] AQUATIC SPEEDWAY

[76] Inventor: Harold N. Braunhut, 200 Fifth Ave., New York, N.Y. 10010

[22] Filed: Aug. 14, 1973

[21] Appl. No.: 388,240

[52] U.S. Cl. .................... 272/4; 119/5; 119/15.5; 273/86 R; 61/21
[51] Int. Cl.² .......................................... A63K 1/00
[58] Field of Search ................ 119/5, 15.5; 272/4; 273/86 R

[56] References Cited
UNITED STATES PATENTS

| | | | |
|---|---|---|---|
| 2,117,616 | 5/1938 | Levenstein | 272/4 |
| 2,330,899 | 10/1943 | Levenstein | 272/4 |
| 2,657,927 | 11/1953 | Pease | 272/4 |

FOREIGN PATENTS OR APPLICATIONS

| | | | |
|---|---|---|---|
| 418,830 | 3/1947 | Italy | 272/4 |

Primary Examiner—J. N. Eskovitz
Attorney, Agent, or Firm—Friedman & Goodman

[57] ABSTRACT

An aquatic speedway for racing certain aquatic animals that swim upstream or against the direction of flow of a current of water, includes an elongate open channel. An enclosure or spillway is provided upstream of the channel for controllably discharging water into the latter. An enclosure or reservoir is provided downstream of the channel for receiving water from the latter. A water transfer device in the form of a tube provided with a resilient bulb at one end thereof is utilized for transferring water from the water receiving reservoir to the water discharging enclosure or spillway to raise the level of the water above the channel in the water discharging enclosure or spillway and lower the level of the water below the channel in the water receiving reservoir. In this manner, continued transfer of water from the reservoir to the spillway causes a flow of a stream of water therebetween inducing the animals to a preferred monodirectional movement against the stream suitable for racing them from the region of the water receiving reservoir to the water discharging spillway or enclosure. An aquatic animal handling device is provided for introduction of the animals to the apparatus and recovery therefrom without injury or need to manually touch the animals. The water transfer device hereinbefore mentioned in the form of a tube provided with a resilient bulb at one end, is provided with an opening at the other end of suitable diameter to enable the animal to be collected with a quantity of water by means of suction, and likewise released by pressure. Various accessories for controlling and conducting the race are described.

27 Claims, 15 Drawing Figures

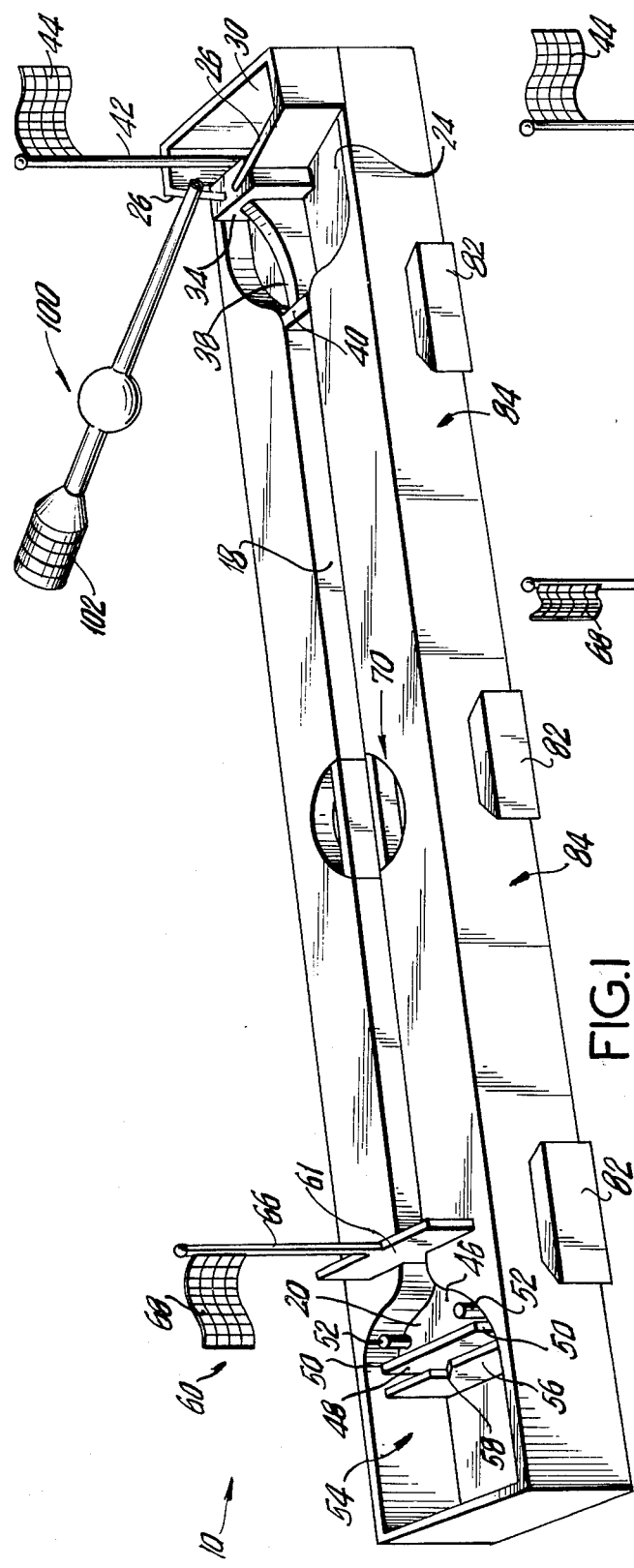
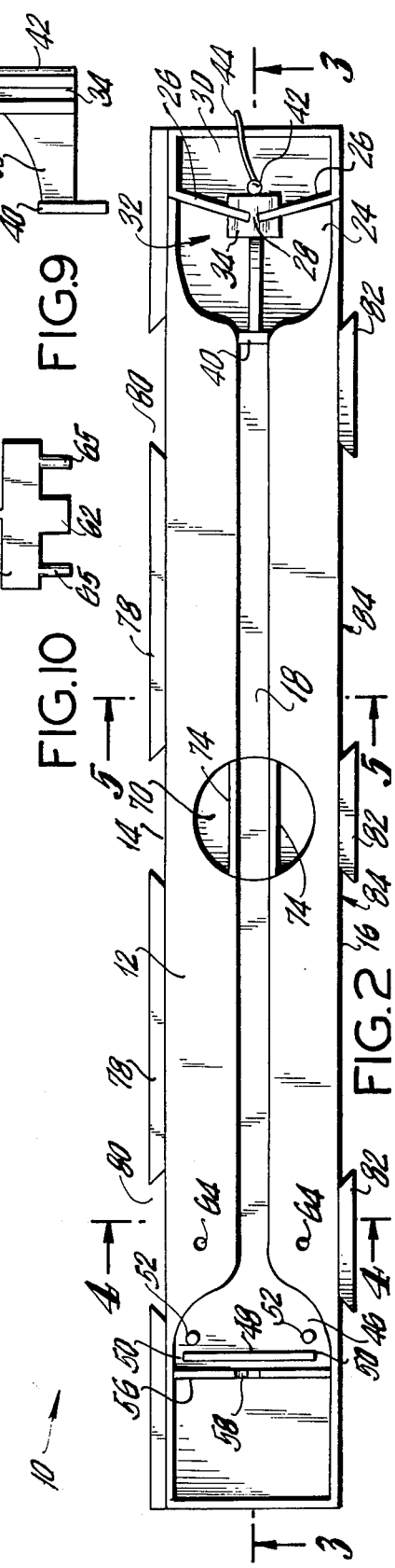

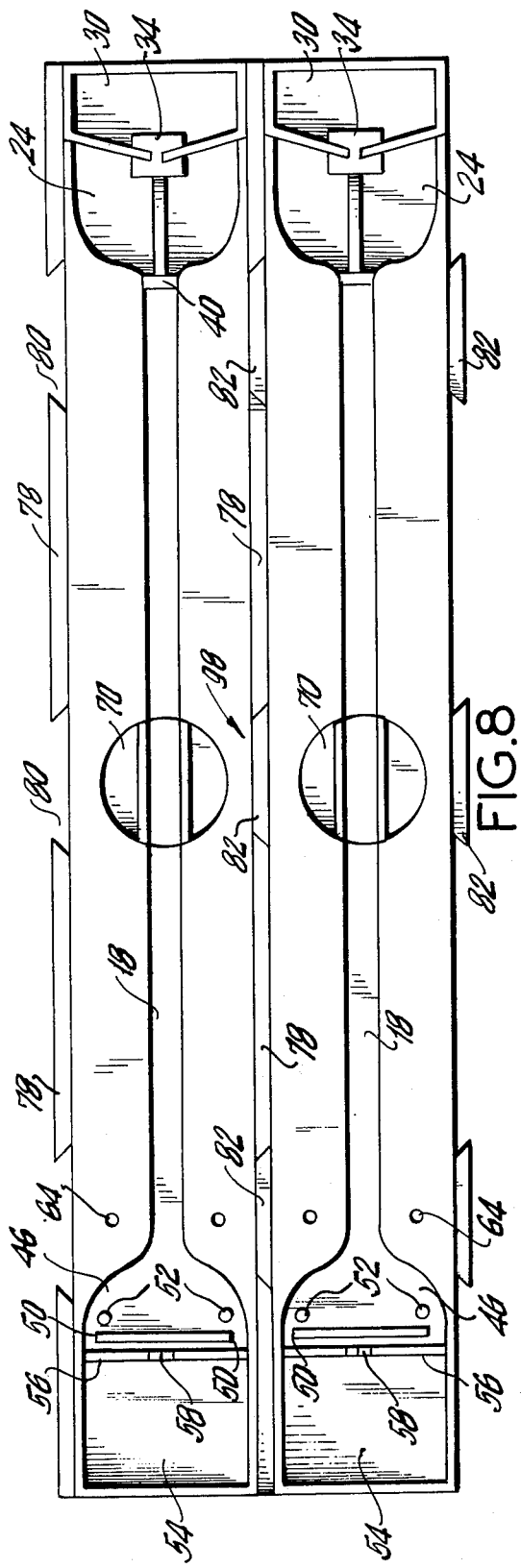

AQUATIC SPEEDWAY

BACKGROUND OF THE INVENTION

The present invention generally relates to games, and more particularly to an aquatic speedway for racing certain aquatic animals that tend to swim upstream against the direction of flow of a current of water.

A fish race apparatus is already known. However, the known apparatus is complex in construction and expensive to manufacture. One apparatus already known in the art is particularly suitable for racing larger aquatic animals such as fish. Further, the prior art apparatus under discussion positions each of the fish to be raced at one end of a respective raceway. When the gates are opened, the owners of the individual fish can do little to control the speed at which the fish traverses the raceway. It has been suggested, with the apparatus above described, that to urge the fish towards the goals, it is possible to move bait in the raceways towards the goals at a speed faster than the fish swim. While such an approach may be useful for larger fish, it is not practical for lower forms of aquatic life such as brine shrimp that would not be motivated to swim by bait but would respond to changes in water current against which they would swim. With respect to such lower forms of aquatic animals, the apparatus under discussion, would result in the players not participating in the race or effecting any control over the outcome thereof.

The known fish apparatus further does not offer interchangeable obstacle means for varying the configurations of the raceway to add variety and interest to the races.

The known fish apparatus further does not offer any means for handling the fish without injury or the need to physically contact them for the purpose of introducing them to the apparatus and removing them therefrom.

Finally, with the fish race apparatus above described, because of the large size thereof and complexity of the construction, it is not practical to change the number of raceways which may be utilized. Consequently, once the race apparatus has been constructed, the number of raceways is fixed and cannot readily be varied to accommodate different numbers of players.

Fish display and observation apparatus is also known which include a plurality of transparent tubes for displaying or studying the actions of fish with reference to water flow, which is artificially produced and controlled. However, the apparatus of this type generally shares the disadvantages above described and is not suitable for individual control by the players of their fish. Typically, a single pump is provided which controls the water flow in each of the individual tubes. Thus, while the apparatus being described may be suitable for observation of fish swimming patterns, it is not suitable for conducting marine or aquatic races wherein, particularly, lower forms of aquatic life such as brine shrimp may be raced with the participation of the individual players.

SUMMARY OF THE INVENTION

It is an object of the present invention to provide an aquatic speedway for racing aquatic animals which tend to swim against the direction of flow of a stream of water which is not possessed of the above disadvantages of comparable prior art raceways.

It is another object of the present invention to provide an aquatic speedway which is simple in construction and economical to manufacture.

It is still another object of the present ivention to provide an aquatic speedway for racing lower forms of aquatic animals such as brine shrimp.

It is yet another object of the present invention to provide an aquatic speedway of the type above described wherein each player can participate in and utilize his skill in conjunction with the stamina, speed and behavior of the aquatic animal to effect some control over the outcome of the race.

It is a further object of the present invention to provide an aquatic speedway which permits changes in the configuration of the speedway to provide obstacle courses therein.

It is still a further object of the present invention to provide an aquatic speedway which maintains the aquatic animals within a water filled channel and prevents the animals from being transported into the water receiving reservoir.

It is still a further object of the present invention to provide an aquatic speedway which maintains the aquatic animals within a water filled holding bay and prevents the animals from entering the mainstream until the race is ready to commence.

It is yet a further object of the present invention to provide an aquatic speedway arrangement which permits the connection of one or more speedways to each other to thereby provide a plurality of parallel channels for racing any desired number of aquatic animals.

It is another object of the present invention to provide an aquatic speedway which embodies a water filled channel wide enough to allow a multiplicity of animals to compete against one another in the same channel by permitting passing.

In order to achieve the above objects, as well as others which will become apparent hereafter, an aquatic speedway, for racing aquatic animals which tend to swim against the direction of flow of a stream of water, comprises a raceway in the form of an elongate open channel. Water discharging means are provided which communicates with one end of said channel for discharging water into the latter. Water receiving means are provided which communicate with the other end of said channel for receiving water from the latter. Water transfer means are provided for transferring water from said water receiving means to said water discharging means to raise the level of the water above said channel in said water discharging means and lowering the level of the water below said channel in said water receiving means. In this manner, continued transfer of water from said water receiving means to said water discharging means causes a flow of a stream of water therebetween suitable for racing the aquatic animals from the region of said water receiving means to said water discharging means.

According to the presently preferred embodiment, said elongate open channel is formed in a plastic support member which is connectable to like plastic support members to increase the number of open channels so that the aqautic animals can be raced in separate channels.

Said water discharging means advantageously comprises an enclosure extending upwardly from the level of said channel. Said enclosure has a top opening and a discharge opening in the region of said channel. In this manner, water may be deposited into said enclosure through said top opening with the water discharging through said discharge opening into said channel. Said discharge opening may be in the form of an elongate vertical slot whose effective length may be controlled by the player by slidably moving a suitable valve.

Advantageously, said water receiving means comprises an enclosure extending downwardly from the level of said channel. Said enclosure has a top opening. In this manner, water may be withdrawn from said enclosure through said top opening, the water being received by said enclosure from said channel. Means are provided at the downstream end of said channel for backing up the water within the channel to assure a continuous supply of water in the channel for the aquatic animals.

Trapping means are provided downstream of said channel for permitting flow of water while preventing passage for the aquatic animals into said water receiving enclosure or reservoir.

Holding bays are provided at either end of the channel for entrapping and retaining the aquatic animal for easy introduction into and recovery from the apparatus without injury.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 is a perspective view of the aquatic speedway in accordance with the present invention, showing the water carrier in a position to deposit water within a spillway positioned upstream of the raceway or racing channel;

FIG. 2 is a top plan view of the aquatic speedway shown in FIG. 1 suitable for racing one or more animals;

FIG. 3 is a cross section of the speedway shown in FIG. 2, taken along line 3—3;

FIG. 4 is a cross sectional view of the speedway shown in FIG. 2, taken along line 4—4;

FIG. 5 is a cross sectional view of the speedway shown in FIG. 2, taken along line 5—5;

FIG. 6 is a perspective view of an insert positionable in the path of the raceway or channel shown in FIG. 1 for providing continuity in the straight channel;

FIG. 7 is a perspective view of an insert similar to that shown in FIG. 6 but being provided with curved walls to provide an obstacle course when disposed in the path of the channel or raceway;

FIG. 8 is a top plan view of two aquatic speedways each similar to the speedway shown in FIG. 2, shown connected to each other to race at least two aquatic animals in separate channels;

FIG. 9 is a side elevational view of a water control speed valve and finish gate utilized in conjunction with the speedway positioned upstream of the channel as shown in FIG. 1;

FIG. 10 is a front elevational view of a starting gate positionable downstream of the raceway or channel, as shown in FIG. 1;

DESCRIPTION OF THE PREFERRED EMBODIMENTS

Figure 13:
FIG. 13 is a top plan view of the spillway shown in FIGS. 11 and 12 and of the water control speed valve, showing the manner in which the latter is mounted on the former.

Referring now to the FIGURES, wherein the same reference numerals are utilized to designate similar or identical parts throughout, and first referring to FIGS. 1-5, the aquatic speedway in accordance with the present invention is generally designated by the reference numeral 10. The speedway is particularly suitable for racing small forms of aquatic life such as brine shrimp. However, it will become apparent to one skilled in the art that the same or similar speedway can be utilized for racing larger aquatic forms of life by correspondingly scaling up the dimensions of the speedway.

The speedway 10 is generally in the form of a support member, advantageously molded of plastic, which includes an upper or top wall 12 and opposing parallel side walls 14, 16. The side walls 14, 16 are advantageously normal to the top wall 12 for reasons to be described herafter. A channel or raceway 18 is formed in the upper wall 12, the channel 18 being defined by a bottom wall 20 and spaced side walls 22.

The channel 18 expands or is provided with an enlarged portion 24 at one end thereof. For reasons which will become apparent hereafter, the channel enlargement or holding bay 24 is upstream of the channel 18 and is advantageously funnel-shaped or tapered for reasons which will be described hereafter.

Two spaced vertical walls 26 have opposing edges thereof spaced from each other to form a vertical slot 28 which forms a lateral opening of a spillway or enclosure 30. The spillway 30 is, in the presently preferred embodiment, removable from the plastic support member in which the channel 18 is formed. However, it is possible to integrally form the spillway with the plastic support member.

The spillway 30 is provided with an open top end which is suitable for depositing water within the enclosure defining the spillway.

The spillway rises above the level of the channel 18 and, when water is deposited within the spillway 30, the water escapes or is discharged into the upstream channel enlargement 24. A water control speed valve and finish gate 32, best shown in FIG. 9, cooperates with the spillway 30 for controlling the rate of discharge of the water into the channel enlargement 24.

Figure 12:
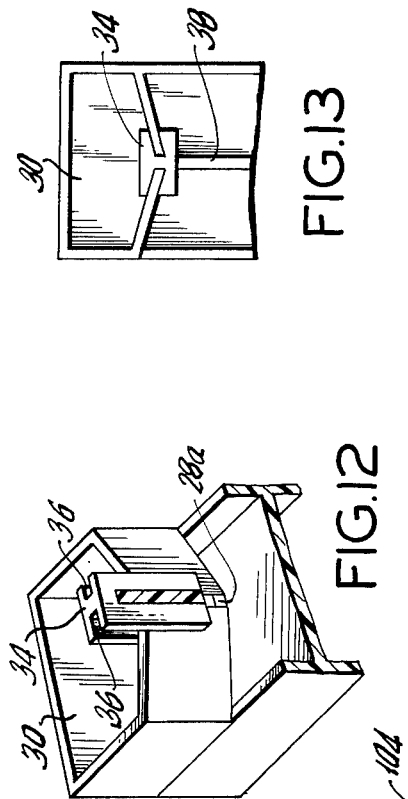
FIGS. 11 and 12 are perspective views of the spillway and of the water control speed valve, showing the latter in two different positions to vary the effective length of the water discharging slot for varying the rate of flow or discharge of water into the channel.
Figure 11:
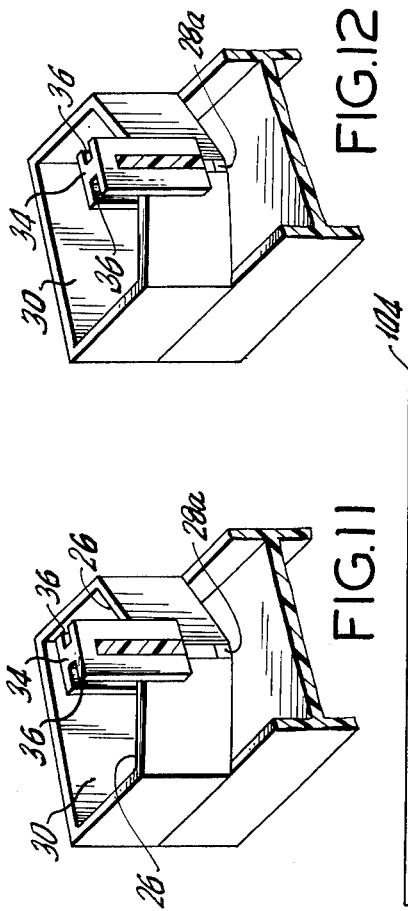

The water control speed valve and finish gate 32 includes a slotted block 34 provided with elongate lateral slots 36 configurated to receive the vertical edges of the walls 26. With this construction, the slotted block 34 can slidably move in vertical directions relative to the walls 26 to change the effective length of the slot 28. Referring to FIGS. 11 and 12, the slotted block 34 is shown in two positions. In FIG. 11, the slotted block 34 is shown in a higher position than in FIG. 12. Consequently, the slot 28a is longer than the slot 28b. Changes in the effective length of the slot permits control of the rate of discharge of the water from the spillway 30 into the channel enlargement 24.

Again referring to FIG. 9, a web 38 extends forwardly from the slotted block 34 and a blocking tab or partition wall 40 is provided at the end of the web 38. The blocking tab 40 is disposed transversely to the general direction of the channel 18 and is provided with a width corresponding to the width of the channel. By slidably moving the slotted block 34 in upward and downward directions as above described, the blocking tab 40 is received to different extents within the channel 18. In the lowermost position of the water control speed valve 32, the blocking tab 40 is fully received in the channel 18 as shown in FIG. 1 and the channel is blocked for preventing both the flow of water as well as of aquatic animals therethrough. Consequently, the blocking tab 40 acts as a further control mechanism for regulating the rate of water flow through the channel. Additionally, the blocking tab 40 has the function of terminating a race wherein one of the aquatic animals moves upstream of the blocking tab 40 which may be considered as the finish line for the race. The player may lower the finish gate 32 once the aquatic animal has moved into the upstream channel enlargement 24 or holding bay. This provides a definitive indication that a winner has been determined.

The finish gate 32 may further be provided with a pole 42 at the free end of which is provided a flag 44. The pole 42 and flag 44, while being decorative, facilitate the gripping of the slotted block 34 for the purpose of slidably moving the latter.

Formed at the upper or downstream end of the channel 18 is a channel enlargement 46 which is advantageously likewise tapered or funnel-shaped. The tapers of the channel enlargement 24 and 46 assure a smooth flow of water which does not unduly interfere with the swimming of the animals.

Extending upwardly from the bottom wall 20 within the downstream channel enlargement 46 is a wall or dam 48 whose width is selected to be smaller than the width of the enlargement 46 to thereby provide lateral spaces 50. The spaces are selected to be sufficiently small to prevent passage therethrough of the particular aquatic animals which are being raced. In this manner, the water may continue to pass beyond the dam 48 while the aquatic animals are maintained within the channel or raceway.

To prevent transportation of the animals by a current flow into the region of the spaces 50, any suitable baffle means may be utilized such as baffle pins 52 which are disposed upstream of the spaces 50. The pins 52 are spaced with respect to the dam wall 48 and the side walls 22 of the channel distances which are smaller than the dimensions of the animals being raced. In this manner, the animals cannot reach the regions of the spaces 50 but are blocked by the pins 52.

Disposed downstream of the dam 48 is an enclosure in the form of a reservoir 54 which is arranged to receive the water which flows through the channel and beyond the dam 48. As best shown in FIG. 3, the spillway 30 generally extends above the bottom wall 20 of the channel 18 while the reservoir 54 is generally disposed below the wall 20. As should be clear, depositing water within the spillway 30 will result in a flow of water through the slot 28 and the channel 18 into the reservoir 54.

Referring to FIGS. 1 and 3, it will be noted that a vertical wall 56 is provided in the reservoir 54 adjacently to the dam 48. It should be noted that the wall 56 rises to a height above the level of the bottom wall 20 of the channel 18. In the presently preferred embodiment, the upper edge of the wall 56 rises to a level which is approximately midway between the bottom wall 20 and the upper wall 12 or between the lower and upper extremities of the channel 18. This construction is necessary to assure a supply of water within the channel 18 for the protection of the aquatic animals. So long as water has been placed within the channel 18, the level therein never drops to a level less than approximately half the height of the channel. This is sufficient to maintain and insure the survival of the animals.

Continued deposition of water within the spillway 30 soon causes the channel 18 to be completely filled with water. At such time, the water may flow through the spaces 50 and over the wall 56 into the reservoir 54. To facilitate the movement of the water over the wall 56, a V-shaped notch 58 is provided which breaks the capillary action of the water and causes the water to flow over the wall 56 at such time as the level of the water in the channel 18 reaches the region of the upper wall 12. Otherwise, due to the capillary surface tension, it may be possible, in certain circumstances, for the water to spill over the upper wall 12 before spilling over the wall 56.

Referring to FIG. 10, a starting gate 60 is shown which includes a transverse member 61 from which depends a blocking tab or partition wall 62. The blocking path 62 is dimensioned to correspond to the width of the channel 18 and is receivable therein as shown in FIG. 1. When so disposed, the blocking tab 62 fully blocks the channel 18 and prevents the passage of water or aquatic animals therethrough. Advantageously, holes 64 are provided on opposite sides of the channel 18 in the upper wall 12 as shown in FIG. 2 which receive pins 65 when the starting gate 60 is in position. Extending upwardly from the transverse member 61 is a pole 66 with a flag 68 at the upper free end thereof. The pole and flag, while being decorative, facilitates the gripping of the starting gate 60.

Referring to FIGS. 1, 2 and 6, a gap is provided in the path of the channel 18 to provide a discontinuity therein. Various insert members may be disposed within the gap to provide variations in the configuration of the path of the raceway 18. In FIG. 6, one track insert 70a is shown which includes a circular base disc 72 and two upwardly spaced parallel extending walls 74. The walls 74 together define or form a straight elongate channel 76 which, when the insert 70a is positioned within the opening in the channel 18, closes the gap and provides a continuous straight path.

In FIG. 7, an alternate track insert 70b is shown which includes a circular base disc 86 from which extends a curved wall 88 to define a curved irregular reversing channel 90. When the insert 70b is placed in the path of the channel 18, the insert represents an obstacle course which requires the brine shrimp, for example, to swim around the curves of the channel 90 before continuing to embark within the straight channel 18 towards the goals.

Figure 14:
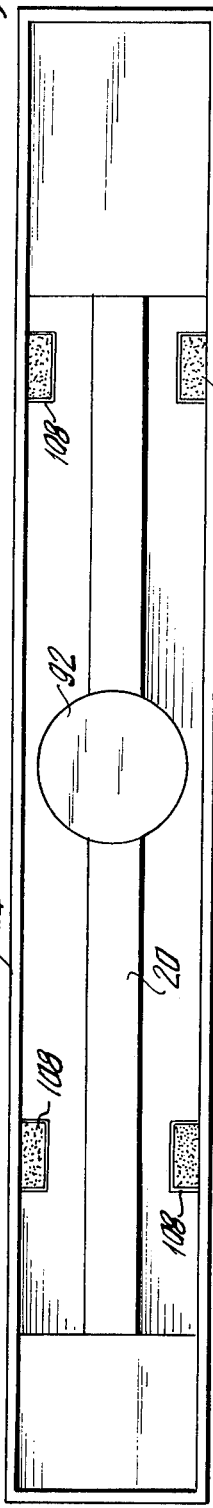
FIG. 14 is a bottom plan view of a further embodiment of the aquatic speedway shown in FIGS. 1 and 2, showing magnets positioned at the side walls of the speedway support member.

Referring to FIGS. 3 and 14, it will be noted that the bottom wall 20 is provided with a circular enlargement 92 which is provided with one or more depressions 94. With such construction, the circular base or disc 72 is provided with nipples 96 receivable within the depressions 94. Such locking engagement as shown in FIG. 3 fixes the position of the track inserts and assures continued alignment of the channel 18 with the inlets and outlets of the straight or curved channel portions formed by the track inserts.

Referring to FIGS. 1 and 2, spaced dovetail inserts 78 are provided along the side walls 14 to thereby form dovetail spaces 80 therebetween. Spaced along the side walls 16 are a plurality of dovetail inserts 82 which are positioned oppositely to the dovetail spaces 80, the inserts 82 forming dovetail spaces 84 which are oppositely disposed relative to the dovetail inserts 78. The dovetail inserts 78 are dimensioned to be receivable within the spaces 84 while the inserts 82 are dimensioned to be received within the inserts 80. Referring to FIG. 8, such a construction permits the mating of two racing speedways 10, wherein the inserts 82 of one raceway 10 are received within the spaces 80 of the other raceway. Further, the inserts 78 of one speedway are receivable within the spaces 84 of the other speedway. In this manner, a dovetail connection 98 is formed which fixes the speedways to one another and permits the interconection of as many or as few of the speedways for racing any desired number of aquatic animals. In all respects, the speedways 10 so connected and shown in FIG. 8 are identical in construction. Of importance, it should be noted that each raceway is provided with its individual support block 34 and blocking tab 40 wherein the rate of flow of water in each raceway or channel can be controlled by each of the players.

The operation of the device will now be described. Each of the channels 18 in which a race is to be conducted is filled with water. As an alternative to providing a separate channel for each aquatic animal, it is possible to place two or more such animals within one channel and conduct the race within said one channel. The starting gate 60 is mounted as shown in FIG. 1 and one or more aquatic animals, such as a brine shrimp, are deposited within the downstream channel enlargement 46. The slotted block 34 is raised relative to the walls 26 to thereby enlarge the slot 28 to the extent desired. Water is deposited by means of any suitable water carrier. In FIG. 1, a presently preferred water carrier 100 is shown which is tubular in form and is provided with a resilient bulb 102 at one end thereof. The water carrier or transfer device 100 is, therefore, in the general form of an enlarged eyedropper device. The device is utilized to deposit water within the spillway 30, the water discharging through the slot 28 into the upstream channel enlargement 24 and subsequently into the channel 18. The starting gate is removed at the start of the race and water is continuously deposited within the spillway 30 at a rate which is determined by the player. Continued discharge of water from the spillway 30 into the channel enlargement 24 causes a flow of a stream of water towards the reservoir 54. The aquatic animals in question, and particularly the brine shrimp, tending to swim against the direction of flow of water, begin to swim upstream towards the blocking tab or finish gate 40. The user can participate in the race by regulating the rate of flow of the water downstream within the channel to optimize the conditions for his entry. As suggested above, the rate of flow of the water is determined both by the quantity of water deposited within the spillway as well as the level of the slotted block 34 or the effective length of the slot 28. When the reservoir 54 becomes full or nearly full, the water carrier 100 may be utilized to withdraw water from said reservoir and refill the spillway 30 therewith. A further use of the water carrier or transfer device is to enable the player to pick up and deposit the aquatic animal into the enlarged area or holding bay at the downstream end of the channel prior to beginning the race, and to recover the animal from the holding bay at the upstream end or finish area of the race. A hole (not shown) of suitable size is provided at the free end of the tube to enable the animal to be collected with a quantity of water by means of suction, and likewise released by pressure.

A winner is determined when an aquatic animal enters the upstream channel enlargement 24 upstream of the blocking tab or finish gate 40 as described above. At this time, the player can fully lower the slotted block 34 to close the winning entry within the upstream channel enlargement 24.

Figure 15:
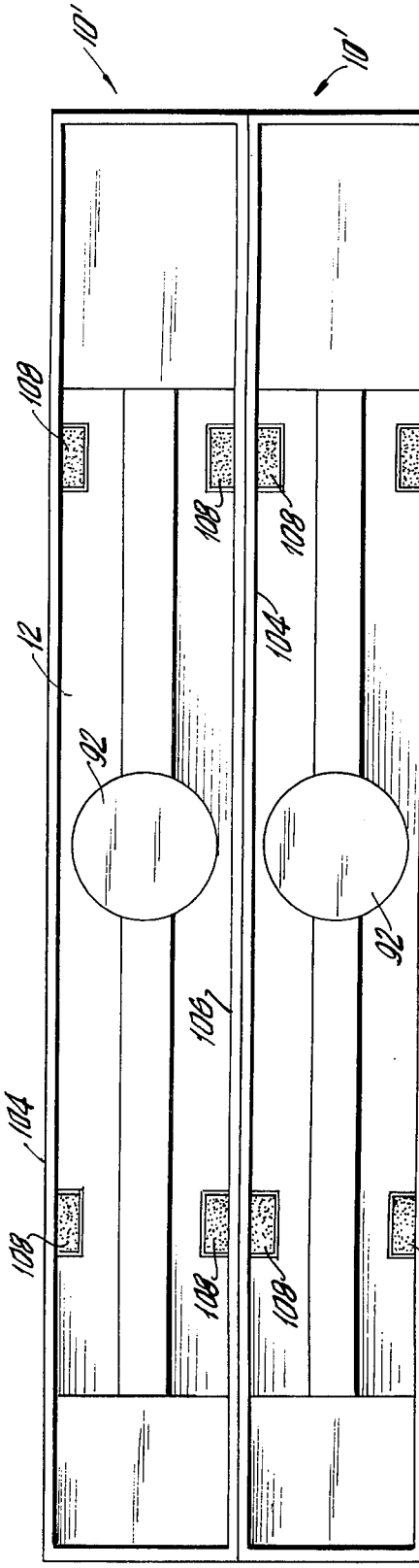
FIG. 15 is similar to FIG. 14 but showing two aquatic speedways joined to each other by means of the magnets.

Referring to FIGS. 14 and 15, a further embodiment 10' of the aquatic speedway is shown which is provided with side walls 104 and 106 along which magnets 108 are disposed. Magnets 108 are utilized in place of the dovetail inserts described in connection with the speedway 10. Advantageously, molded locating wells 109 are provided along the inside surfaces of the walls configurated to receive the magnets 108. In FIG. 15, two speedways 10' are shown joined to one another by means of opposing magnets 108 inside respective walls of the support members. It should be clear that any other conventional means for connecting the modular support members of the type above described may be utilized, with varying degrees of advantage with upright walls 14, 16, for example, spring or retaining clips may be introduced into the same molded locating wells 109 with each clip spanning two walls and resiliently holding the latter together.

From the above description, it is evident that the aquatic speedway in accordance with the present invention is particularly suitable for racing small forms of aquatic animals in a manner which permits active participation by the players who can decidedly help determine the outcome of the race by controlling the conditions thereof. As many or as few aquatic animals may be so raced.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An aquatic speedway for racing aquatic animals that tend to swim against the direction of flow of a current of water, comprising a raceway in the form of an elongate open channel; water discharging means communicating with one end of said channel for discharging water into the latter; water receiving means communicating with the other end of said channel for receiving water from the latter; and water transfer means for transferring water from said water receiving means to said water discharging means to raise the level of the water above said channel in said water discharging means and lower the level of the water below said channel in said receiving means, said water transfer means comprising a tubular member provided at one end with a resilient bulb and at the other end with an opening and in the general form of an eyedropper device, whereby transfer of water may be manually effected, and whereby continued transfer of water from said water receiving means to said water discharging means causes a current of water to flow therebetween suitable for racing the aquatic animals from the region of said water receiving means to said water discharging means.

2. An aquatic speedway as defined in claim 1, wherein said elongate open channel is formed in a plastic support member.

3. An aquatic speedway as defined in claim 1, wherein said water discharging means comprises an enclosure extending upwardly from the level of said channel, said enclosure having a top opening and a discharge opening in the region of said channel, whereby water may be deposited into said enclosure through said top opening, the water discharging through said discharge opening into said channel.

4. An aquatic speedway as defined in claim 3, wherein said discharge opening is in the form of an elongate vertical slot.

5. An aquatic speedway as defined in claim 1, wherein said water receiving means comprises an enclosure extending downwardly from the level of said channel, said enclosure having a top opening, whereby water may be withdrawn from said enclosure through said top opening, the water being received by said enclosure from said channel.

6. An aquatic speedway as defined in claim 5, wherein a vertical wall is disposed in said enclosure downstream of said channel, said wall rising from the floor of said enclosure to a height above the height of the flow of said channel, whereby depositing water into said water discharging means causes water to accumulate in said channel to the level of said wall to assure a continuous supply of water in said channel for the aquatic animals.

7. An aquatic speedway as defined in claim 6, wherein the upper edge of said wall is provided with a cut-out portion to break the capillary surface tension of the water accumulated in said channel in the region of said wall, whereby water spills over said wall into said enclosure when the level of water in said channel rises to a predetermined height.

8. An aquatic speedway as defined in claim 7, wherein said wall extends approximately to a height midway between the upper and lower extremeties of said channel, said predetermined height to which water rises prior to spilling into said enclosure being approximately the height of the upper extremity of said channel, whereby the water spills into said enclosure prior to overflow of water out of said channel.

9. An aquatic speedway as defined in claim 7, wherein said cut-out is V-shaped.

10. An aquatic speedway as defined in claim 1, wherein each end of said channel is enlarged in width to facilitate handling of the aquatic animals at the beginning and at the conclusion of a race.

11. An aquatic speedway as defined in claim 10, wherein the enlarged ends are funnel-shaped to provide a smooth flow of water.

12. An aquatic speedway as defined in claim 1, wherein said water transfer means is provided at the other end with an opening of suitable diameter to enable the animal to be collected with a quantity of water by means of suction, and likewise released by pressure.

13. An aquatic speedway as defined in claim 1, further comprising a starting gate provided with a blocking tab having the width of said channel, and positioning means for removably positioning said blocking tab in said channel downstream thereof, whereby positioning said blocking tab in said channel and placing aquatic animals downstream of said blocking tab prevents the animals from swimming upstream in said channel until said starting gate is removed.

14. An aquatic speedway as defined in claim 13, wherein holes are provided to each side downstream of said channel, and said positioning means comprises a pin on each side of said blocking tabs receivable in one of said holes.

15. An aquatic speedway as defined in claim 1, wherein said channel is provided in a support member having side walls, and further comprising connecting means on said side walls for connecting at least two support members to one another to dispose the two associated channels in parallel relation to race at least two aquatic animals.

16. An aquatic speedway as defined in claim 15, wherein said connecting means comprises a dovetail arrangement.

17. An aquatic speedway as defined in claim 15, wherein said connecting means comprises magnets provided on said side walls.

18. An aquatic speedway as defined in claim 1, wherein said channel is selected to be sufficiently wide to permit a plurality of aquatic animals to race therein with space to pass one another.

19. An aquatic speedway for racing aquatic animals that tend to swim against the direction of flow of a current of water, comprising a raceway in the form of an elongate open channel; water discharging means commuticating with one end of said channel for discharging water into the latter said water discharging means comprising an enclosure extending upwardly from the level of said channel, enclosure having a top opening and a discharge opening in the region of said channel, whereby water may be deposited into said enclosure through said top opening, the water discharging through said discharge opening into said channel; water receiving means communicating with the other end of said channel for receiving water from the latter; water transfer means for transferring water from said water receiving means to said water discharging means to raise the level of the water above said channel in said water discharging means and lower the level of the water below said channel in said water receiving means; and discharge control valve means associated with said discharge opening for controlling the rate of flow from said discharging means into said channel, said discharge opening being in the form of an elongate vertical slot formed by the edges of two spaced vertical walls and wherein said discharge control valve means comprises a block slotted to receive the edges of said walls, whereby slidable movement of said block with respect to said wall changes the effective length of said slot for permitting passage of water therethrough into said channel, and whereby continued transfer of water from said water receiving means to said water discharging means causes a current of water to flow therebetween suitable for racing the aquatic animals from the region of said water receiving means to said water discharging means.

20. An aquatic speedway as defined in claim 19, further comprising support means extending from said block towards said channel, and a blocking wall connected to said support means and having dimensions corresponding to those of said channel, whereby slidable movement of said block changes the extent to which said blocking wall is received within said channel and the extent to which water and an aquatic animal may proceed through said channel.

21. An aquatic speedway for racing aquatic animals that tend to swim against the direction of flow of a current of water, comprising a raceway in the form of an elongate open channel; water discharging means communicating with one end of said channel for discharging water into the latter; water receiving means communicating with the other end of said channel for receiving water from the latter; water transfer means for transferring water from said water receiving means to said water discharging means to raise the level of the water above said channel in said water discharging means and lower the level of the water below said channel in said water receiving means; and trapping means provided downstream of said channel for permitting flow of water and prevent passage of the aquatic animals into said water receiving means, said trapping means comprising a transverse wall in said channel, said transverse wall having a length less than the width of said channel to form at least one space between said transverse wall and a side wall of said channel, said space being dimensioned to prevent passage of an aquatic animal therethrough whereby continued transfer of water from said water receiving means to said water discharging means causes a current of water to flow therebetween suitable for racing the aquatic animals from the region of said water receiving means to said water discharging means.

22. An aquatic speedway as defined in claim 21, wherein two spaces are formed, one between each end edge of said transverse wall and another side wall of said channel.

23. An aquatic speedway as defined in claim 22, further comprising baffle means disposed in the region of each space for preventing the aquatic animal from being transported by water flow into the region of said spaces.

24. An aquatic speedway as defined in claim 23, wherein said baffle means comprises a vertical pin positioned upstream of each space and spaced relative to said transverse wall and the side wall of said channel distances less than those of the aquatic animals, whereby an aquatic animal transported by water flows towards a space is stopped by said pin and one of said walls.

25. An aquatic speedway for racing aquatic animals that tend to swim against the direction of flow of a current of water; comprising a raceway in the form of an elongate open channel with a gap provided in the continuity of said channel; water discharging means communicating with interchangeable channel insert means receivable in said gap, each insert means modifying the configuration of said channel; water discharging means communicating with one end of said channel for discharging water into the latter; water receiving means communcating with the other end of said channel for receiving water from the latter; and water transfer means for transferring water from said water receiving means to said water discharging means to raise the level of the water above said channel in said water discharging means and lower the level of the water below said channel in said water receiving means, whereby continued transfer of water from said water receiving means to said water discharging means causes a current of water to flow therebetween suitable for racing the aquatic animals from the region of said water receiving means to said water discharging means.

26. An aquatic speedway as defined in claim 25, wherein said insert means includes two spaced straight parallel walls to provide continuity to said channel means when inserted into said gap.

27. An aquatic speedway as defined in claim 25, wherein said insert means includes two spaced curved walls to provide a curved obstacle course along said channel means.

* * * * *